United States Patent [19]
Bray

[11] 3,966,616
[45] June 29, 1976

[54] MEMBRANE CARTRIDGE

[75] Inventor: Donald T. Bray, Escondido, Calif.

[73] Assignee: Desalination Systems, Inc., Escondido, Calif.

[22] Filed: Nov. 27, 1974

[21] Appl. No.: 527,686

[52] U.S. Cl. .......................... 210/433 M; 210/450; 210/494 M
[51] Int. Cl.² ........................................ B01D 31/00
[58] Field of Search ............ 210/321, 494, 433, 450

[56] References Cited
UNITED STATES PATENTS

| | | | |
|---|---|---|---|
| 3,400,825 | 9/1968 | Shippey | 210/450 X |
| 3,417,870 | 12/1968 | Bray | 210/494 X |
| 3,542,204 | 11/1970 | Clark | 210/450 X |

*Primary Examiner*—Frank A. Spear, Jr.
*Attorney, Agent, or Firm*—Clement H. Allen

[57] ABSTRACT

An improved spiral wound reverse osmosis or ultrafiltration membrane cartridge has the inner end and side areas of a permeate transfer leaf sealingly attached to its central collection tube surface, with sealing adhesive applied as band areas near each side edge of the proximate transfer leaf surface in amount in excess of the amount to substantially fill a pair of circumferential grooves in the collection tube when the assembly, including the permeate transfer leaf is spirally wound around it. The adhesive seal is preferably cured at room temperature with the cartridge standing on one of its ends for a period of about 12 to 24 hours. In an alternative embodiment, resilient O rings may be seated in the collector tube grooves, and an additional pair of grooves within the side band areas may also be filled with adhesive.

4 Claims, 7 Drawing Figures

U.S. Patent June 29, 1976 Sheet 1 of 2 3,966,616
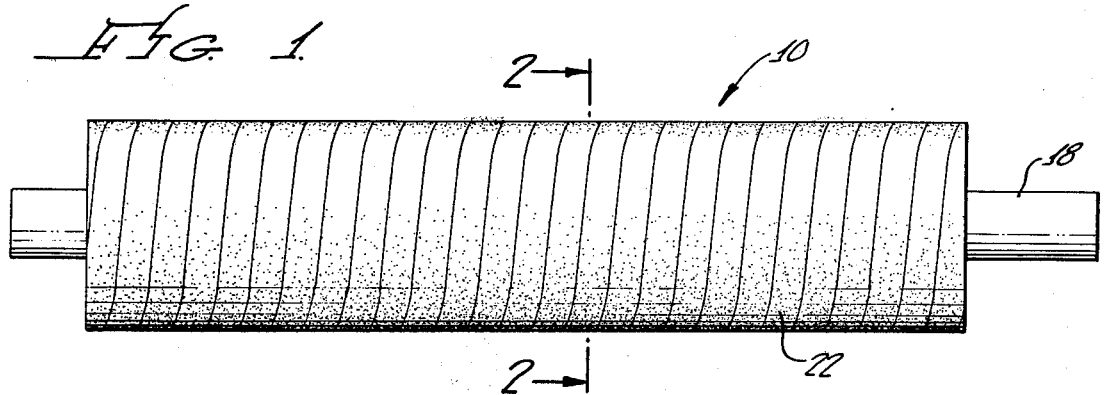
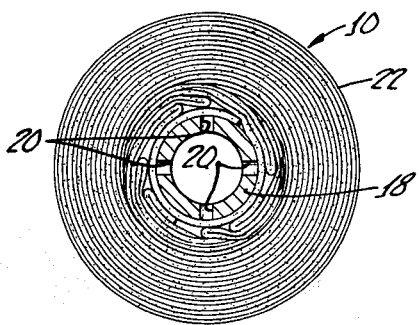
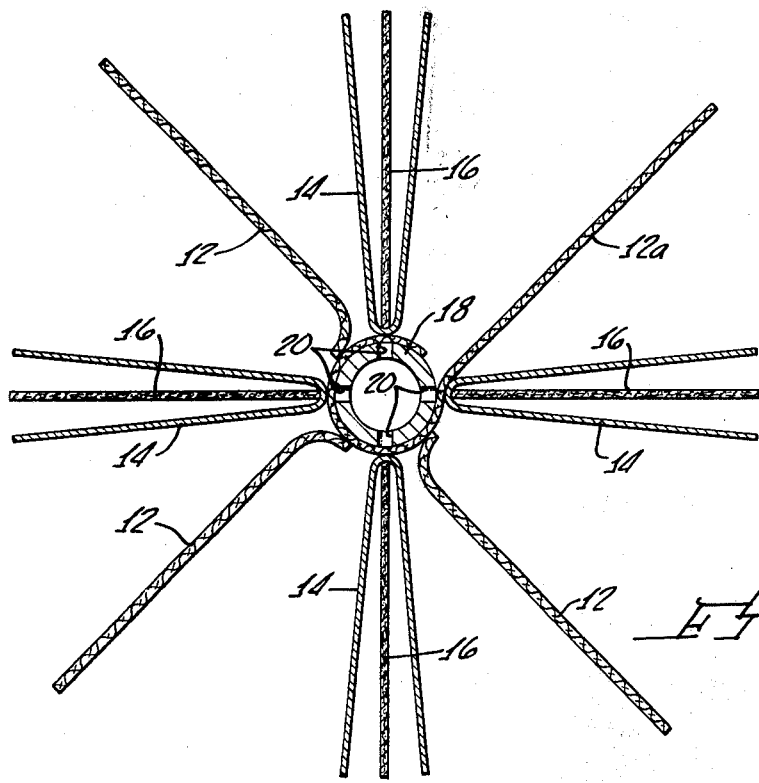

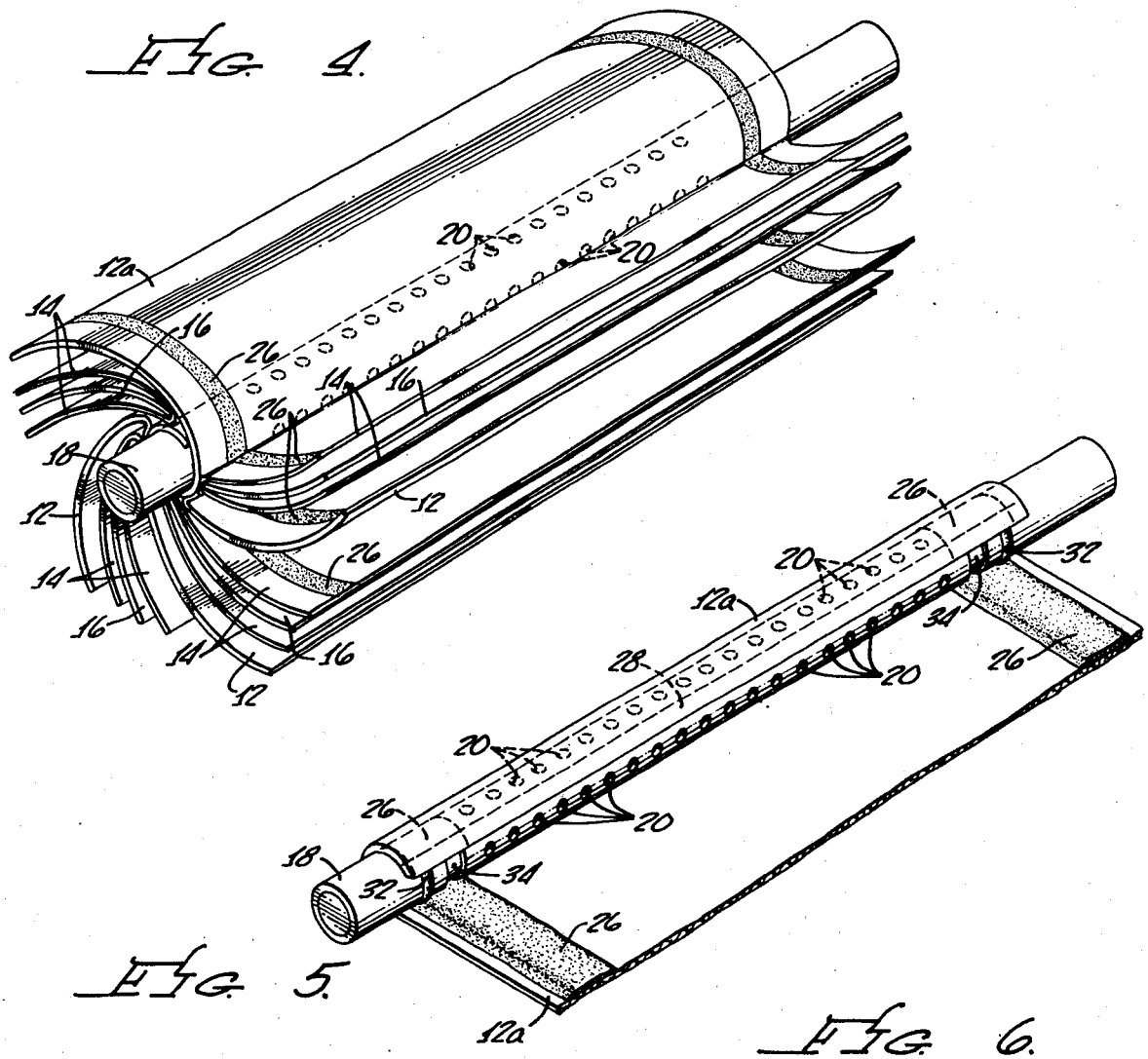
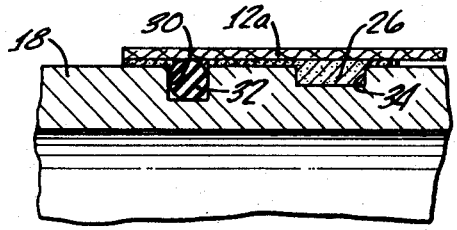
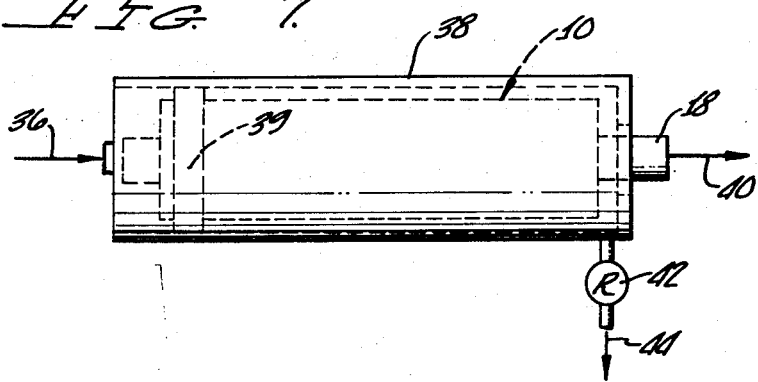

MEMBRANE CARTRIDGE

BACKGROUND OF THE INVENTION

1. The Field of the Invention

This invention relates to a membrane cartridge for use in reverse osmosis and ultrafiltration systems.

2. The Prior Art

My previous patent No. 3,417,870 describes a so-called spiral wound membrane cartridge typical of the prior art. The "module" of U.S. Pat. No. 3,417,870 is more aptly described, it is believed, in this application as a cartridge; and the backing material of U.S. Pat. No. 3,417,870 is referred to herein as a permeate transfer leaf.

As will be seen in U.S. Pat. No. 3,417,870, a product water or permeate transfer leaf overlays a central perforated collection tube, an end area and side band areas of the transfer leaf being attached to the collection tube surface by a sealing adhesive. Membrane leaves folded around separator leaves are arranged as shown between product water transfer leaves, end and side band areas of the membrane leaves being also sealingly attached to the product water transfer leaves. The assembly of membrane leaves, permeate transfer leaves and spacer leaves is tightly wrapped around the collector tube to form a spiral wound membrane cartridge.

The spiral wound cartridge design has worked well in reverse oxmosis and ultrafiltration systems and many commercial installations are now operating successfully. However, the application of sealing adhesive between the central collection tube and the permeate transfer leaf has often resulted in an imperfect seal in spite of most careful application techniques and selection of adhesive. The principal reasons for leaks appear to be the inherent difficulty of providing a glue that is compatible to use as a transfer leaf glue and still adhere well to the collection tube surface; and differential expansion and contraction between the glue at the collection tube surface and the collection tube itself. Such differential expansion and contraction may be due to thermal effects caused by temperature changes, and dimensional changes caused by increase or decrease in pressure. These effects, which may be encountered after glueing is complete, may break the seal between the transfer leaf and the collection tube surface causing a short circuit water leak at the collection tube surface. Testing after assembly has often disclosed from 20% to at times as high as 40% of assembled cartridges defective because of leaky permeate transfer leaf to collection tube surface seals.

A completely reliable and leak-proof seal between a permeate transfer leaf and the collection tube surface in a spiral wound membrane surface would be extremely advantageous.

SUMMARY OF THE INVENTION

Summarized briefly, this invention provides an improved spiral wound membrane cartridge for use in reverse osmosis and ultrafiltration systems comprising a perforated central collection tube around which is wound an assembly of at least one permeate transfer leaf, membrane leaf, and brine side spacer leaf; an end area and side band areas of the permeate transfer leaf being attached by a sealing adhesive to adjacent surfaces of the collector tube while being in communication with the perforations therein. The collector tube is provided with a pair of circumferential grooves, each spaced inward from the proximate side edge of the permeate transfer leaf, an excess of sealing adhesive being employed to form the side edge sealing band areas and to fill the grooves. A resilient O-ring may be seated in each groove and sufficient excess adhesive used to fill the crevices between the resilient O-rings and the collection tube grooves and the transfer leaf surfaces. In a modification, additional circumferential grooves are arranged, spaced apart from the O-ring seal grooves but within the side edge adhesive band areas and which are filled with sealing adhesive for attachment to the transfer leaf surface.

BRIEF DESCRIPTION OF THE DRAWINGS

In the drawings:

FIG. 1 shows a general side view of a membrane cartridge embodying features of this invention.

FIG. 2 shows a vertical cross section of the cartridge of FIG. 1, taken along the line 2—2.

FIG. 3 shows in cross section how the permeate transfer leaves, membrane leaves and spacer leaves are arranged around the central collector tube in the cartridge of FIG. 1.

FIG. 4 shows in perspective how the permeate transfer leaves, membrane leaves and spacer leaves are wound around the central collector tube in the cartridge of FIG. 1.

FIG. 5 shows a perspective view enlarged of the attachment of the end and sides of a permeate transfer leaf to the central collector tube.

FIG. 6 shows a much enlarged sectional fragmentary view of a sealing O-ring and an adhesive filled groove in the attachment shown in FIG. 5.

FIG. 7 shows a reverse osmosis system employing the membrane cartridge of this invention.

DESCRIPTION OF PREFERRED EMBODIMENTS

Referring now to FIGS. 1 to 4, a reverse osmosis cartridge 10 is formed by winding an assembly of at least one permeate transfer leaf 12, folded membrane leaf 14, and brine side spacer leaf 16 around a central collection tube 18 having perforations 20. The leaves are assembled as shown in FIG. 3 with sealing adhesive covering end and side areas of the permeate transfer leaves and membrane leaves, and then are wound into a spiral wound cartridge with an outer tape covering 22 as seen in FIGS. 1 and 2. The fabrication of such spiral wound cartridges or modules is described in considerable detail in my earlier U.S. Pat. No. 3,417,870.

Attachment of a permeate transfer leaf, specifically 12a, to the adjacent surface of collector tube 16 is accomplished by interposing side band areas as at 26 and end area 28 of a sealing adhesive. Adhesion and sealing to side band areas 26, as seen more clearly in FIGS. 5 and 6, is accomplished by providing circumferential grooves 30 in collector tube 18 filled with sealing adhesive and in which may be seated, as shown, resilient O-ring 32. These O-ring seals and grooves are arranged each near one side edge of transfer leaf 12a so that they will be immersed in the sealing adhesive 26 applied as a band on transfer leaf 12a, and the seal is thereby substantially improved. In a preferred embodiment, supplementary circumferential grooves 34 are arranged in collection tube 18 spaced apart slightly from O-ring seal grooves 30, but still within the adhesive bands 26 at the sides of transfer leaf 12a. These additional grooves 34 are initially open, that is they do not contain O-rings, however, they fill up with excess adhesive applied as bands 26 when the transfer sheet 12a is wound in spiral form around collector tube 18. In like manner, excess adhesive will fill up the crevices around O-rings, 32 between these O-rings and adjacent collection tube and permeate transfer leaf surfaces as seen more clearly in the enlarged fragmentary view of FIG. 6. It will be apparent that an excess of adhesive should be used as bands 26 in order to fill the interspaces between transfer leaf 12a and collector tube 18 around O-ring 32 and in grooves 30 and 34, as described. In FIG. 6, for clarity and ease of understanding, a layer of adhesive of appreciable thickness is shown between transfer leaf 12 and the surface of tube 18. In practice, this layer will be extremely thin as the excess adhesive is pressed out, and would be impossible to illustrate in proportionate dimension. Seal band 28 across the end of transfer leaf 12a is sufficiently wide to provide adequate adhesion and sealing, yet is sufficiently narrow to leave perforations 20 in collector tube 18 in open and free communication with the surface of transfer leaf 12a.

Grooves 30 will be of width slightly greater than depth to provide proper conventional seating of O-rings 32. In the case of grooves not fitted with an O-ring such as grooves 34, their width should preferably be substantially greater than their depth and generally greater than the width of the O-ring-containing grooves.

In order to obtain best sealing employing the O-ring seal 32 as described, and also with an originally open or supplementary groove 34, the adhesive should be selected for adhesion and flexibility under conditions of use. Adhesive compositions of the catalyst setting type, such as epoxy glues, have been found satisfactory, adhering well to the membrane and collector tube surfaces under conditions of constant immersion in water or fluids. A satisfactory adhesive is a mixture of epoxy resins sold under the trade names Gen-Epoxy 177 and Versamid 140 in proportion of 30:70 by weight as described in U.S. Pat. No. 3,367,504. Such adhesives of the catalyst type take an initial set in a short time, but need to be cured, preferably at room temperature or a slightly elevated temperature, for example, about 70° to 90°F, to develop full strength before use. Practical curing time is often from a few hours up to about 24 hours. The adhesive, even though initially set, may remain slightly plastic until fully cured. I have found that after the membrane cartridges according to this invention are fully fabricated, they should be cured by maintaining them in upright position on one end at a temperature no lower than normal room temperature, that is about 70°F, and up to about 90°F. Curing time should be at least 12 hours and preferably up to about 24 hours. Curing in the upstanding position is important to obtain best sealing according to this invention, particularly with the open groove embodiment and should be started promptly after fabrication of the cartridge is complete, preferably within an hour. I have found that if the adhesive is cured with the cartridge in lying down position, the adhesive may have a tendency to creep unevenly with respect to the plane of the O-ring or groove seal and thus cause faulty sealing. However, if the curing is carried out in the upstanding position according to this invention, the tendency for the adhesive to creep is apparently reduced since it is held in grooves and areas which lie in a horizontal plane; and even if it does creep, it will creep evenly around the O-ring or groove seal. This appears to avoid a run-out at a point or points (typically the lowest point at the bottom) when the cartridge is cured in lying down position. A run-out of this nature can result in a deficiency of sealant in a local area and can cause a faulty seal.

Materials employed for construction of the reverse osmosis cartridge of this invention will be selected by those skilled in the art for the particular application. The collector tube 16 may be fabricated by conventional methods of suitable high strength plastic such as polyvinylchloride; the membranes may be of suitably fabricated cellulose acetate; the permeate transfer leaves may be of porous felt or fabric; the spacer leaves may be of open mesh material of polypropylene, for example, as marketed under the trade name VEXAR. The O-ring seals may be fabricated of a natural or synthetic elastomer.

An example of operation of the membrane cartridge of this invention will be clear from FIG. 7, which shows diagramatically a small output reverse osmosis system for producing purified water for home use from a municipal water supply. The municipal water supply at about 30-100 psi is indicated at 36 entering one end of a pressure container 38 containing a membrane cartridge 10 according to this invention, sealed to the interior wall of pressure container 38 by peripheral seal 39. One end of central collection tube 18 of membrane cartridge 10 protrudes from an end of pressure resistant container 38 and is sealed thereto, to carry out purified product water as at 40, its other end being conventionally closed. The blowdown or concentrate produced in pressure resistant container 38 is released therefrom through a restrictor 42, which may be of the back pressure control valve type or may be an orifice or long tube, providing necessary release of concentrate to drain as at 44 while maintaining operating pressure for reverse osmosis purification in pressure container 38. Such a system can produce water in amount of a few gallons per day containing less than 100 ppm total dissolved solids from municipal supply water containing from up to about 1,000 ppm TDS.

The membrane cartridge employing the improved seal between transfer leaf and collector tube according to this invention is particularly valuable when employing ribbed fabric such as tricot as the transfer leaf or backing material as described and claimed in my U.S. Pat. No. 3,813,384 issued May 28, 1974. Employment of a ribbed transfer leaf while substantially improving liquid transfer to the collection tube must be carefully sealed to the collection tube to avoid leaks, principally because of the thickness of the transfer leaf.

The membrane cartridge of this invention may be employed in reverse osmosis or ultrafiltration systems. It provides a simple yet effective method for substantially improving the seal between transfer leaves and collector tubes to ensure a substantially improved reliability in operation and freedom from leaks. The percentage of leaking membrane cartridges determined by quality control check has, for example, been reduced from between 20% and 40% to below 10% and often below 5% when employing the improved cartridge of this invention. Careful examination of "leakers" has shown that this 5% generally leak where the end edge of the transfer leaf is sealed to the collection tube and not at the sides of the transfer leaf, so that the groove and O-ring seal arrangement has proved to be almost 100% effective. This has saved substantial manufacturing costs for repairing or reworking leaky cartridges. The resilient O-ring employed in the sealing arrangement is a simple and inexpensive article of commerce; and seating and sealing grooves as described may be machined or otherwise formed in collection tube surfaces at small expense. Use of a resilient O-ring embedded in sealing adhesive as a seal promoter is quite different from the conventional use of such O-rings. These, as is well known, are generally employed without sealants or adhesives, seated in grooves for contact with an adjacent surface.

The reason for the effectiveness of the sealing arrangement of this invention is not precisely known, but it is postulated that the O-ring will continue to provide a seal even if a separation of adhesive from the collector tube occurs. In the case of the groove filled with glue or sealing adhesive, if the adhesive to collector tube adhesion should fail, the adhesive in the groove, being slightly plastic, could act as an O-ring to maintain the seal.

I claim:

1. A membrane cartridge for reverse osmosis and ultrafiltration systems comprising a perforated central collection tube around which is spirally wound an assembly of at least one permeate transfer leaf, membrane leaf and brine side spacer leaf; an end area and side band areas of said permeate transfer leaf being attached by a sealing adhesive to adjacent surfaces of said perforated central collection tube; in which the improvement comprises:

a. a pair of circumferential grooves in said perforated central collection tube, each of said grooves being spaced apart from the other and within one of said side band areas of said permeate transfer leaf;

b. a resilient O-ring seated in each of said grooves in said perforated central collection tube; and c. said sealing adhesive applied to said side band areas of said permeate transfer sheet and substantially filling the crevices between said resilient O-rings and said grooves in said collection tube and said permeate transfer leaf when said assembly of at least one permeate transfer leaf, membrane leaf and brine side spacer leaf is spirally wound around said perforated central collection tube.

2. A membrane cartridge according to Claim 1, in which said sealing adhesive is catalyst setting epoxy composition.

3. A membrane cartridge according to claim 1, in which a pair of additional circumferential grooves are arranged in said perforated central collection tube, each of said additional circumferential grooves being within one of said side band areas of said permeate transfer leaf to which sealing adhesive is applied, and spaced apart from said grooves in which said resilient O-rings are seated, said sealing adhesive also substantially filling said additional circumferential grooves when said assembly of at least one permeate transfer leaf, membrane leaf and brine side spacer leaf is spirally wound around said perforated central collection tube.

4. A membrane cartridge according to claim 3, in which the width of said additional circumferential grooves is greater than the width of the circumferential grooves in which resilient O-rings are seated.

* * * * *